United States Patent [19]

Matoba et al.

[11] Patent Number: 5,727,087
[45] Date of Patent: Mar. 10, 1998

[54] IMAGE PROCESSOR USING IMAGE DATA COMPRESSION CODING OF FIXED COMPRESSION RATE

[75] Inventors: Narihiro Matoba; Masaru Onishi, both of Kamakura, Japan

[73] Assignee: Mitsubishi Denki Kabushiki Kaisha, Tokyo, Japan

[21] Appl. No.: 407,694

[22] Filed: Mar. 21, 1995

[30] Foreign Application Priority Data

Mar. 28, 1994 [JP] Japan .................. 6-057018

[51] Int. Cl.$^6$ ............................ H04N 1/46
[52] U.S. Cl. ............ 382/234; 382/232; 382/166
[58] Field of Search ............... 382/234, 166, 382/232; 358/539

[56] References Cited

U.S. PATENT DOCUMENTS

| | | | |
|---|---|---|---|
| 4,788,598 | 11/1988 | Ochi et al. | 358/260 |
| 5,122,872 | 6/1992 | Nagano | 358/78 |
| 5,357,354 | 10/1994 | Matsunawa et al. | 358/518 |
| 5,363,219 | 11/1994 | Yoshida | 358/539 |
| 5,483,358 | 1/1996 | Sugiura et al. | 358/508 |
| 5,488,483 | 1/1996 | Murayama | 358/539 |

FOREIGN PATENT DOCUMENTS 89285894  10/1989  Japan ................. H04N 1/32

OTHER PUBLICATIONS

SPIE–The International Society for Optical Engineering "Color Hard Copy and Graphic Arts" Feb. 11–14, 1992.

*Primary Examiner*—Jose L. Couso
*Assistant Examiner*—Matthew C. Bella
*Attorney, Agent, or Firm*—Wolf, Greenfield & Sacks, P.C.

[57] ABSTRACT

In an image processor using image data compression coding of a fixed compression rate, the data of one color of image data is stored in a coding memory without coding, if compression coding is not necessary. If the compression coding is necessary, the data is coded by an encoder by compression coding with a compression rate of 4, and the coded data of four colors, i.e. cyan, magenta, yellow and black, are stored in the coding memory. Since the image data is compressed by a fixed compression rate, it is possible to estimate the quantity of data after compression. As a result, the coding memory can be used effectively, without using a fixed disc unit.

5 Claims, 5 Drawing Sheets

IMAGE PROCESSOR USING IMAGE DATA COMPRESSION CODING OF FIXED COMPRESSION RATE

BACKGROUND OF THE INVENTION

1. Field of the Invention

This invention relates to an image memory for storing and reading image data in and from a nonvolatile or secondary storage, and more particularly to an image processor for effectively using the memory by utilizing constant-compression coding.

2. Description of the Related Art

Today various kinds of apparatuses for processing digital image data have been proposed. The apparatuses to deal with digital image data range from a facsimile, as a typical example, to many other kinds such as a printer and a scanner.

In many of such conventional apparatuses, to deal with digital image data, there is generally equipped an image memory for storing image data of one screen. In recent years, however, image data to be dealt by the image processors continues to become much more precise and minute while the quantity of image data is becoming immense. Along with this, the proportion of the image memory price compared to the overall apparatus price is increasing. Also, apparatuses for dealing with full-color data are becoming more popular, and in these apparatuses, semiconductor memories of generally in the order of tens of mega bytes are used as image memories. Such an image memory requires a capacity sufficient to store one-screen image data of the image to be dealt by the apparatus. This is because color adjusting, edit processing, brightness and contrast adjusting, etc. take place in units of one-screen images.

Thus, with the conventional image processing apparatus, since the cost of image memories is high, the apparatus is unavoidably expensive.

With the foregoing problems in view, a printer using a hard disc unit, as an image memory, as a substitute for a semiconductor memory is proposed in, for example, Japanese Patent Laid-Open Publication No. HEI 4-144760. Namely this printer includes a predetermined buffer device.

The reason why semiconductor memories have currently been chiefly used as image memories is that semiconductor memories are high in data read/write rate. In many of the conventional apparatuses, however, semiconductor memories are used only for the image data of one screen or one color. Consequently in order to deal with a plurality of images, suitable data communication with an external hard disc unit is needed. In many other conventional apparatuses, image data is transferred one color after another, in which case the image processing apparatus can perform image processing color by color.

None of the foregoing conventional apparatuses are effective in processing plural images.

SUMMARY OF THE INVENTION

It is therefore an object of this invention to provide an image processor in which the apparent capacity of a coding memory can be increased using fixed-length-compression coding of image data by compressing image data of plural colors and storing the compressed image data in a nonvolatile storage and in which image data of one color can be processed in the conventional manner as if it is not compressed.

To solve the foregoing problems, according to a first aspect of the invention, there is provided an image processor comprising: coding means for fixed-length-compression coding original image data at a compression rate of an N-th power of 2 (N is a positive integer) and outputting coded data; a coding memory for storing the original image data of one color of at least one screen; and a write selector for selecting the original image data or the coded data and storing the selected data in the coding memory, the coding memory being capable of storing the coded data of plural colors from among the coded data of one screen, when the write selector selects the coded data.

According to a second aspect of the invention, in the image processor of the first aspect of the invention, the compression rate of the coding means is four, and the coding memory is capable of storing the coded data of all of red, green and blue colors from the coded data of the one screen when the write selector selects the coded data.

According to a third aspect of the invention, in the image processor of the first aspect of the invention, the compression rate of the coding means is four, and the coding memory is capable of storing the coded data of all of cyan, magenta and yellow colors from the coded data of the one screen when the write selector selects the coded data.

According to a fourth aspect of the invention, in the image processor of the third aspect of the invention, the coding memory is capable of storing the coded data of black out of the coded data of the one screen when the write selector selects the coded data.

According to a fifth aspect of the invention, in the image processor of the first aspect of the invention, the coding means comprises: dividing means for dividing the original image data into small areas, each being a predetermined coding unit; reference level setting means for setting a reference level to be a reference when designating plural representative tonal levels representing the tonal levels of the individual pixels in each small area; differential value setting means for setting a differential value representing the difference between each of the representative tonal levels in the individual small area and the reference level; and resolution component value setting means for setting, for each of the pixels in the individual small area, a resolution component value representing as to which pixel is associated with which one of the plural representative tonal levels; the coded data being the reference level, the differential value and the resolution component value for every small area.

According to a sixth aspect of the invention, there is provided an image processor comprising: a coding memory for storing original image data of one color of at least one screen; decoding means for fixed-length-expansion decoding of data stored in the coding memory and outputting the decoded data; and a read selector for selecting the data read from said coding memory or the decoded data and outputting the selected data; the read selector being capable of selecting the data read from the coding memory if the original image data is stored in the coding memory.

According to a seventh aspect of the invention, in the image processor of the sixth aspect of the invention, the coded data of each of red, green and blue colors are stored in the coding memory, and the decoding means decodes the coded data, outputs the original image data of four times the quantity of the coded data and outputs the original image data of the one screen.

According to an eighth aspect of the invention, in the image processor of the seventh aspect of the invention, the coded data of each of cyan, magenta and yellow colors are stored in the coding memory, and the decoding means decodes the coded data and outputs the original image data of the one screen.

According to a ninth aspect of the invention, in the image processor of the eighth aspect of the invention, the coded data of black is also stored in the coding memory, the decoding means decodes the decoded data and outputs the original image data of the one screen.

According to a tenth aspect of the invention, in the image processor of the first or sixth aspect of the invention, the coded data stored in the coding memory comprises a reference level to be a referenced when designating plural representative tonal levels representing the tonal levels of the individual pixels in each small area, a differential value representing the difference between each of the representative tonal levels in the individual small area and the reference level, and a resolution component value representing which pixel is associated with which one of the plural representative tonal levels. Based on the reference level, the differential value and the resolution component value, the decoding means decodes the coded data for every small area and outputs the original image data.

According to an eleventh aspect of the invention, in the image processor of the first or sixth aspect of the invention, the coding memory has plural banks corresponding to the coded data of plural colors and is capable of reading and writing the coding data independently for each corresponding color.

According to a twelfth aspect of the invention, in the first or sixth aspect of the invention, the coding memory has four independently accessible banks and is capable of reading and writing the coded data independently for each of red, green and blue colors.

According to a thirteenth aspect of the invention, in the image processor of the first or sixth aspect of the invention, the coding memory has four independently accessible banks and is capable of reading and writing the coded data independently for each of cyan, magenta and yellow colors.

According to a fourteenth aspect of the invention, in the image processor of the first or sixth aspect of the invention, the coding memory has four independently accessible banks and is capable of reading and writing the coded data independently for each of cyan, magenta, yellow and black colors.

According to a fifteenth and a sixteenth aspect of the invention, in the image processor of the first or sixth aspect of the invention, the coding memory is a nonvolatile or secondary storage.

According to a seventeenth aspect of the invention, in the image processor of the first aspect of the invention, the coding means comprises: dividing means for dividing the original image data into small areas, each being a predetermined coding unit; representative tonal level setting means for setting plural representative tonal levels representing the tonal levels of the individual pixels in each small area; and resolution component value setting means for setting, for each of the pixels in the individual small area, a resolution component value representing which pixel is associated with which one of the plural representative tonal levels; the coded data being the representative tonal levels and the resolution component value for every small area.

According to an eighteenth aspect of the invention, in the image processor of the sixth aspect of the invention, the coded data comprises the representative tonal levels and the resolution component value for every small area, and based on the representative tonal levels and the resolution component value, the decoding means decodes the coded data for every small area and outputs the original image data.

According to a nineteenth and a twentieth aspect of the invention, there is provided a scanner including the image processor of the first or sixth aspect of the invention.

According to a twenty-first and a twenty-second aspect of the invention, there is provided a printer including the image processor of the first or sixth aspect of the invention.

According to a twenty-third and a twenty-fourth aspect of the invention, there is provided a digital copying machine including the image processor of the first or sixth aspect of the invention.

According to a twenty-fifth and a twenty-sixth aspect of the invention, there is provided a display unit including the image processor of the first or sixth aspect of the invention.

In operation, the coding means of the first aspect of the invention codes the original image data by fixed-length compression coding and stores the coded data of plural colors in the coding memory.

The coding means of the second aspect of the invention is capable of storing, in the coding memory in which the original image data of one color of one screen are stored, the original image data of red, green and blue colors as data compressed at a compression rate of four.

The coding means of the fourth aspect of the invention is capable of storing in the coding memory the original image data of black, in addition to the cyan, magenta and yellow colors, compressed in the same manner.

The coding means of the fifth aspect of the invention generates the reference level, the differential value and the resolution component value, as the coded data, for every small area of a predetermined coding unit.

The decoding means of the sixth aspect of the invention decodes the original image data by fixed-length-expansion decoding and decodes the coded data of plural colors in the coding memory.

The decoding means of the seventh aspect of the invention decodes the coded data of each of red, green and blue colors stored in the coding memory and outputs the original image data of one screen.

In the eighth aspect of the invention, the coded data of cyan, magenta and yellow colors, instead of red, green and blue colors, are stored in the coding memory.

In the ninth aspect of the invention, the coded data of black, in addition to cyan, magenta and yellow colors, is stored in the coding memory.

The coding means of the tenth aspect of the invention outputs the reference level, the differential value and the resolution component value for every small area of a predetermined coding unit; accordingly the coded data comprises the reference level, the differential value and the resolution component value.

The coding memory of the eleventh aspect of the invention has banks corresponding to the individual colors and can therefore perform data processing for every bank.

The coding memory of the twelfth aspect of the invention has four independent banks and can therefore cover each of red, green and blue colors, thus realizing a quick process for every color.

The coding means of the thirteenth aspect of the invention has four independent banks and can therefore cover each of cyan, magenta and yellow colors, thus realizing a quick process for every color.

The coding means of the fourteenth aspect of the invention has four independent banks and can therefore cover each of cyan, magenta, and yellow colors, as well as black, thus realizing a quick process for every color.

The coding memory of the fifteenth and sixteenth aspects of the invention is a nonvolatile or secondary storage having four independent banks corresponding to cyan, magenta, yellow and black, and therefore a quick process can be realized for each color.

The coding means of the seventeenth aspect of the invention outputs the representative tonal levels and the resolution component value, as the coded data, for every small area of a predetermined coding unit.

The decoding means of the eighteenth aspect of the invention decodes the coded data composed of the representative tonal levels and the resolution component value for every small area, and outputs the original image data.

The scanner of the nineteenth and twentieth aspects of the invention includes the image processor of the foregoing aspects of the invention and can therefore demonstrate the same results as the image processor of each aspect.

The printer of the twenty-first and twenty-second aspects of the invention includes the image processor of the foregoing aspects of the invention and can therefore demonstrate the same results as the image processor of each aspect.

The digital copying machine of the twenty-third and twenty-fourth aspects of the invention includes the image processor of the foregoing aspects of the invention and can therefore demonstrate the same results as the image processor of each aspect.

The display unit of the twenty-fifth and twenty-sixth aspects of the invention includes the image processor of the foregoing aspects of the invention and can therefore demonstrate the same results as the image processor of each aspect.

DETAILED DESCRIPTION OF THE PREFERRED EMBODIMENTS

Several preferred embodiments of this invention will now be described with reference to the accompanying drawings.

EMBODIMENT 1

Figure 1:
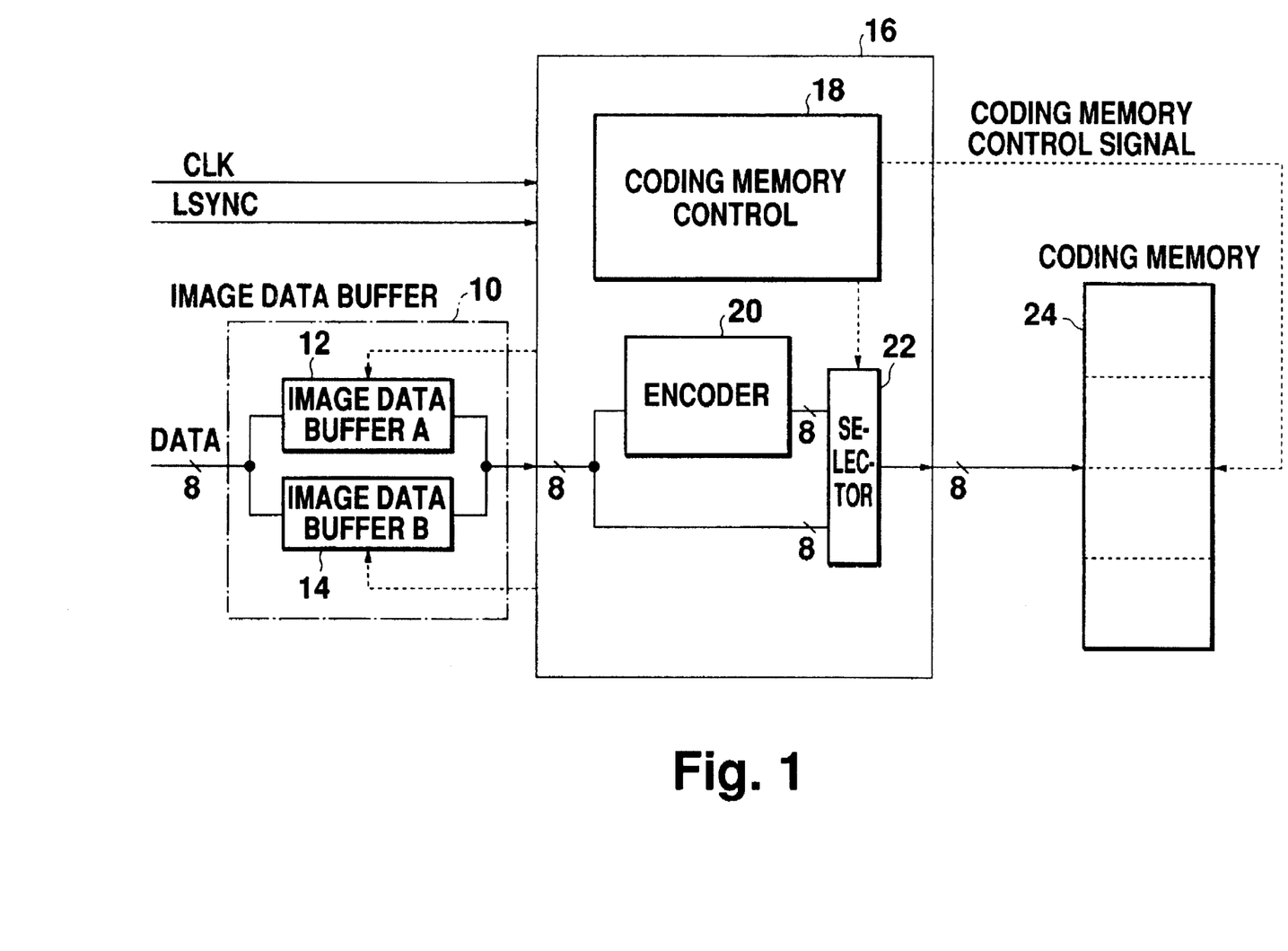
FIG. 1 is a block diagram of an image processor according to a first embodiment of this invention.

FIG. 1 is a block diagram of an image processor according to a first embodiment of the invention.

As shown in FIG. 1, firstly original image data is inputted to an image data buffer 10. The image data buffer 10 includes an image data buffer A 12 and an image data buffer B 14 and acts as a so-called toggle buffer. The original image data is supplied to a coding section 16 via the image data buffer 10 serving as the toggle buffer.

The coding section 16, as shown in FIG. 1, comprises a coding memory controller 18 for supplying a coding memory control signal to a coding memory 24 and also supplying a coding signal to a selector (described below) 22 in synchronism with the coding memory control signal, an encoder 20 for fixed-length-compression coding the original image data sent to the image data buffer 10, and the selector 22 for selecting the coded data from the encoder 20 or the original image data from the image data buffer 10.

The data selected by the selector 22 is written into the coding memory 24. A characteristic feature of this embodiment is that the encoder 20 performs fixed-length-compression coding. In this embodiment, the compression rate is fixed to four. Thus, since fixed-length-compression coding is used, it is possible to predetermine the quantity of the coded data after compression. By coding the original image data to be stored in the coding memory 24, it is possible to predetermine how much data, namely, how many times the quantity of data, can be stored.

The coding memory 24 of the first embodiment has a capacity corresponding to the data of one color in one screen. For example, in the case of A3 size, the capacity of image data of a resolution of 400 dpi (dot per inch) is approximately 32 M bytes; however, by coding the original image data by a compression rate of 4, it is possible to compress the data into a capacity of 8 M bytes for a single color. The capacity of the coded data of four colors (e.g., cyan, magenta, yellow and black) is 32 M bytes, which corresponds to the capacity of the noncoded original image data of one color.

This embodiment is constructed using the foregoing principles. If the coding memory 24 prepared for the original image data of one color is coded, it may be used as a coding memory in which the data of all colors in one screen can be stored. If not coded, it may be used as a memory for the image of one color in one screen.

A characteristic feature of the first embodiment is that the original image data is compressed constantly into ¼ by fixed-length compression coding. It is thereby possible to compress the image data of all of cyan, magenta, yellow and black colors for storage in the coding memory 24.

Figure 2:
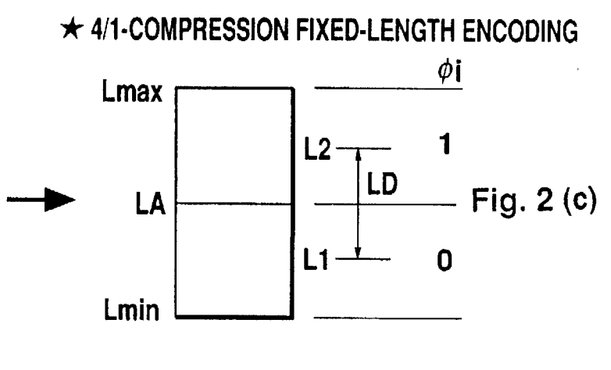
FIGS. 2(a) through 2(e) illustrate a coding method to be used in the first embodiment.
Figure 2A:
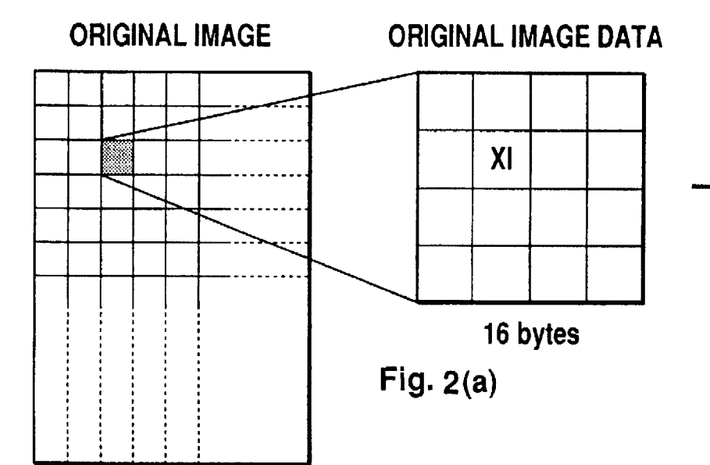

FIGS. 2(a) through 2(e) illustrate the flow of fixed-length-compression coding. As shown in FIG. 2(a), the original image data is divided into predetermined small areas, e.g. of a 4×4 block in the first embodiment. In the first embodiment, the value of a single pixel is represented by 8 bits, the quantity of image data of a 4×4 small area is 16 bytes.

For 16 pixels, firstly its mean value LA is obtained. The value LA is a reference level in this invention. The maximum value of the pixels is represented by Lmax, and the minimum value is represented by Lmin. Then, from the maximum value Lmax, a mean value L1 of the pixels in the range of the mean value LA is found. Further, from the mean value LA, a mean value L2 of the pixels in the range down to the minimum value Lmin is found. A difference LD between L1 and L2 is calculated. LD is a differential value in this invention.

Then, for every pixel, a resolution component value of this invention is calculated by comparing the value of each pixel with the mean value LA. In other words, if the pixel value is below the mean value LA, the resolution component value of the pixel is 0. If the pixel value is over the mean value LA, the resolution component value of the pixel is 1. This algorithm is shown in FIG. 2(b), in which the resolution component value is represented by fi (i=1, 2, 3 ... 16). The concept of this coding is shown in FIG. 2(c).

As the result of this coding, for a single 4×4 small area, the coded data composed of LA, LD and sixteen resolution component values fi are generated. Accordingly, because the original image data is 4×4=16 bytes, the compression rate is 16/4=4.

In FIG. 1, the coding section 16 is equipped with the encoder 20. In the absence of compression, the encoder 20 must be bypassed. For this purpose, the selector 22 selects the image data, which is to be supplied to the coding memory 24, from the original image data or the coded data according to the requirements.

To the coding section 16, a clock signal CLK, a line synchronous signal LSYNC are supplied from external sources. Further, as shown in FIG. 1, the individual data are transmitted and received via an 8-bit bus.

EMBODIMENT 2

Figure 3:
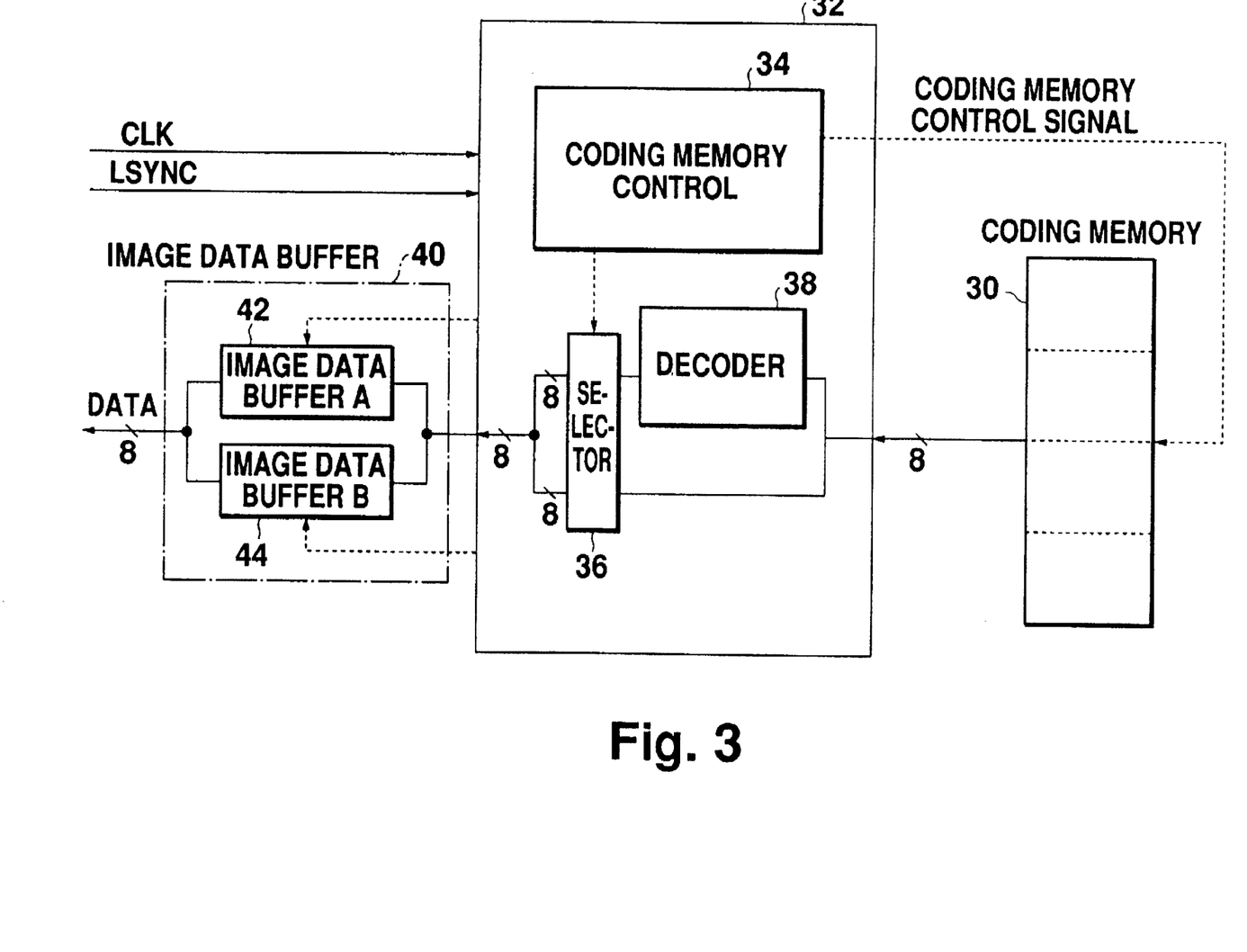
FIG. 3 is a block diagram of an image processor according to a second embodiment of the invention.

FIG. 3 shows an image processor according to a second embodiment of the invention. The image processor of the second embodiment has a decoding section 32 corresponding to the coding section 16 of the first embodiment. As shown in FIG. 3, the data stored in the coding memory 30 is sent to the decoding section 32 and is decoded according to the requirements. In the second embodiment, the decoding section 32 comprises a coding memory control section 34 for supplying a coding memory control signal to the coding memory 30 and also supplying a control signal to a selector (described below) 36 in synchronism with the coding memory control signal, a decoder 38 for decoding the coded data, which is read from the coding memory 30, by fixed-length-expansion decoding, and the selector 36 for selecting the decoded data from the decoder 38 or the original image data from the coding memory 30.

The data selected by the selector 36 are supplied to an image data buffer 40, which is composed of an image data buffer A 42 and an image data buffer B 44 and hence acts as a so-called toggle buffer.

The second embodiment is characterized by that the decoder 38 for fixed-length decoding is substituted for the encoder 20. In the second embodiment, by fixed-length-expansion decoding, it is possible to decode the original image data to four times the coded data. Further, the selector 36 selects the data outputted from the decoder 38 or the data read from the coding memory 30 and outputs the selected data to the subsequent image data buffer 40. For this purpose, if the image data of one color of one screen in the noncoded original image data is not stored in the coding memory 30, the selector 36 selects the image data read from the coding memory 30 and outputs the data of one color of the original image data to an external destination. On the other hand, if the coded data, e.g. the coded data of each of cyan, magenta, yellow and black colors, after coding is stored in the coding memory 30, the selector 36 selects the data outputted from the decoder 38 and outputs the data of each color of the original image data to the external destination.

As described above, according to this embodiment, since not only the data stored in the coded memory 30 after fixed-length-compression coding but also the data stored in the coding memory 30 without coding are dealt with, it is possible to process the image data more flexibly.

EMBODIMENT 3

Figure 4:
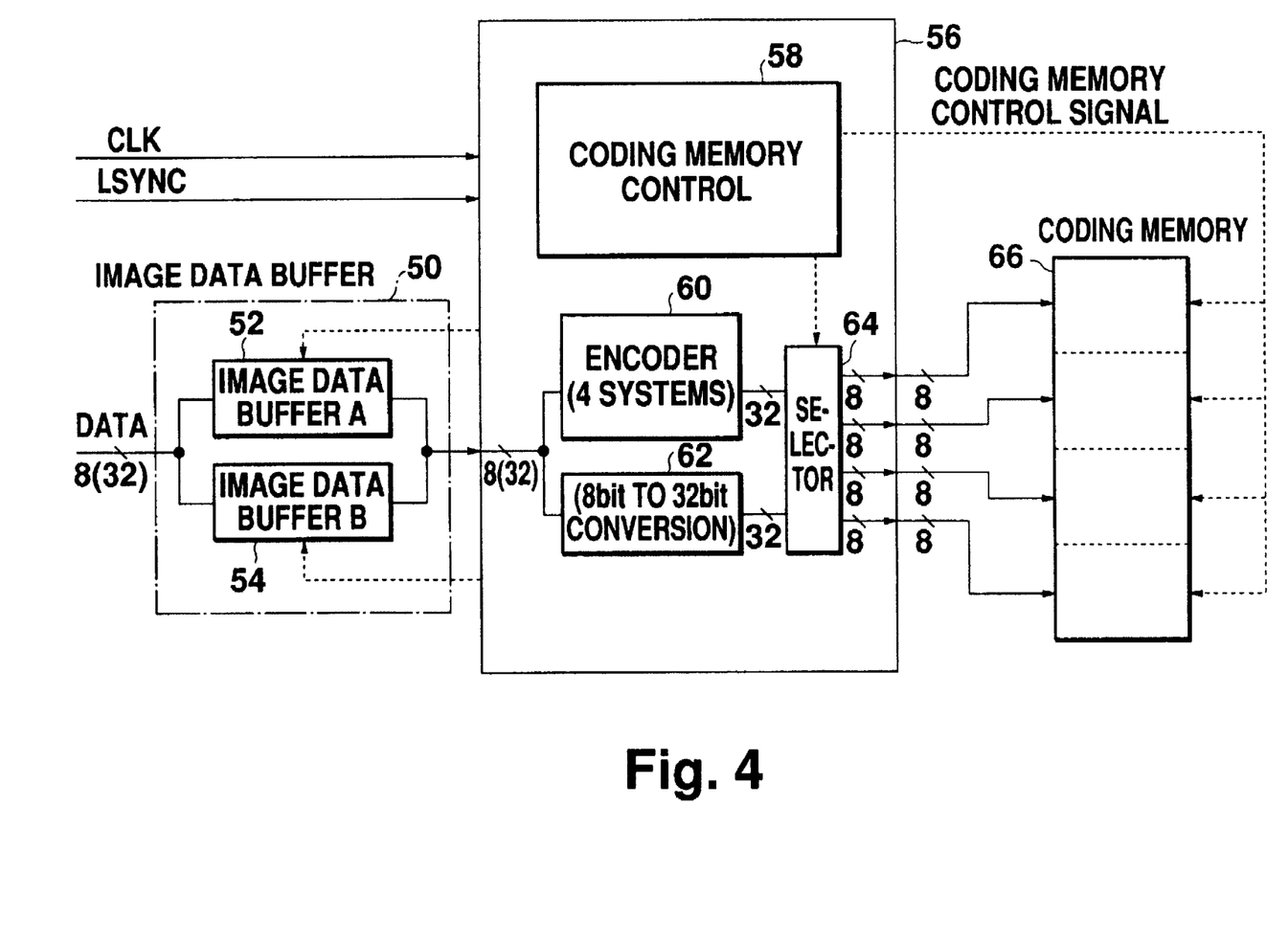
FIG. 4 is a block diagram of an image processor according to a third embodiment of the invention.

FIG. 4 is a block diagram of an image processor according to a third embodiment of the invention. As shown in FIG. 4, firstly original image data is inputted to an image data buffer 50, which comprises an image data buffer A 52 and an image data buffer B 54 and acts as a so-called toggle buffer. The original image data is supplied to a coding section 56 via the image data buffer 50 serving as a toggle buffer.

The coding section 56, as shown in FIG. 4, comprises a coding memory controller 58 for supplying a coding memory control signal to a coding memory 66 and also supplying a coding signal to a selector (described below) 64 in synchronism with the coding memory control signal, an encoder 60 for fixed-length-compression coding the original image data sent to the image data buffer 50, and the selector 64 for selecting the coded data from the encoder 60 or the original image data from the image data buffer 50. The coding section 56 further includes a bit converter 62 for expanding 8-bit data from the image data buffer 50 to 32-bit data. When selecting the data from the image data buffer 50 without coding, the selector 64 selects the data via the bit converter 62 after 8-bit data is converted into 32-bit data.

Also in the third embodiment, like the second embodiment, the encoder 60 performs fixed-length-compression coding at a compression rate of 4. The third embodiment is characterized by that the coding memory 66 is divided into four banks. Since the coding memory can be accessed as four independent banks and one continuous bank in the units of coded data of one color, it is possible to process the data of the individual colors simultaneously during coding, and if the image data is stored without coding, it is possible to process 4-byte data simultaneously. High-speed processing can therefore be achieved. In either case, the coding memory may be accessed in units of 8 bits.

In the third embodiment, since the coding memory 66 is divided into four independently accessible banks, if the image data is to be stored after fixed-length-compression coding, it is possible to perform processing for the individual banks (the individual colors) simultaneously, realizing a high-speed data processor. In this embodiment, like the first embodiment, the capacity of the image data buffer 50 is 8 bits. Alternatively the image data buffer 50 may have a capacity of 32 bits to match with 32 bits (8 bits×4 banks) of the coding memory 66.

EMBODIMENT 4

In the foregoing embodiments, the compression rate of fixed-length-compression coding is 4, preferably the N-th power of 2 (N is a positive integer larger than 1).

For example, it is preferable that the compression rate is 8. Assuming that, likewise the first through third embodiments, the coding memory has the capacity of data of one color of original image data, it is possible to store the data of two colors by fixed-length-compression coding if the image data is composed of four colors, cyan, magenta, yellow and black.

It is also preferable to divide the coding memory into banks in units of screens. Specifically, in the first embodiment, the coding memory is divided into four banks in units of colors so that data of each color can be processed simultaneously. If the compression rate is 8, the data of one screen uses only a half of the bank memory of one color, it is preferable to subdivide the memory of each color into halves. Finally, the coding memory is composed of eight banks. If the coding memory is thus composed of banks in terms of screens, it is possible to process the image data of each screen simultaneously. As a result, a high-speed image processor can be achieved.

EMBODIMENT 5

In the first embodiment, fixed-length-compression coding with a compression rate of 4 is a method shown in FIG. 2. The method of FIG. 2 is fixed-length-compression coding of the so-called three-component type in which coded data comprises the reference level, the differential value and the resolution component value. However, if the number of reference levels are two (two kinds), it is possible to make decoding quicker because the coded data is composed of only the two reference levels rather than the reference levels and the differential value.

Figure 5:
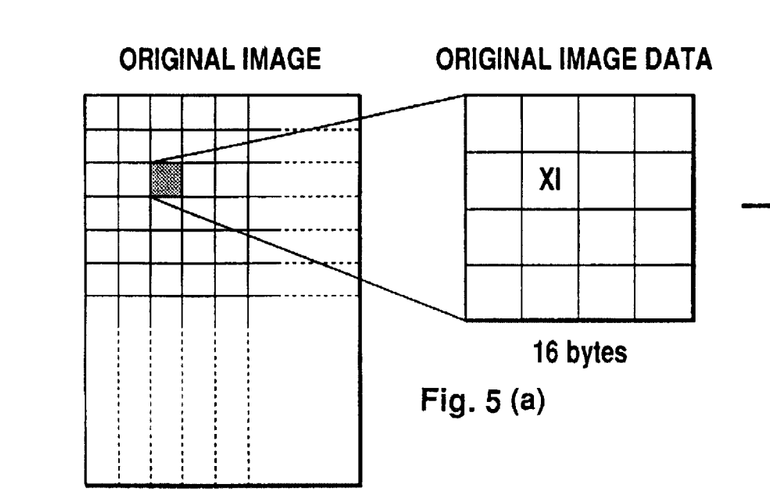
FIGS. 5(a) through 5(e) illustrate an image coding method to be used in an image processor according to a fourth embodiment of the invention.

The compression coding method of a compression rate of 4 using this principle is illustrated in FIGS. 5(a) through 5(e). This method is similar to the method of FIGS. 2(a) through 2(e) in that original image data is divided into 4×4-byte small areas and is coded small area by small area, and that the mean value LA, the mean value L1 ranging between the maximum value Lmax and the mean value LA, and the mean value L2 ranging between the mean value LA and the minimum value Lmin are obtained. The fifth embodiment is characterized by that the coded data comprises L1 and L2 instead of the mean value LA and DA (=L2−L1). According to the fifth embodiment, the structure of the coded data is shown in FIG. 5(d), namely, the quantity of the coded data is same as in FIG. 2(d), and hence the compression rate is 4.

However, decoding of coded data of the fifth embodiment can be performed with maximum ease. Namely, since the value of each pixel after decoding is L1 or L2 depending on whether fi is 0 or 1, only mere substitution is necessary so that quick decoding can be expected.

On the other hand, the coded data shown in FIG. 2(d) comprises the mean value LA and the differential value DA (=L2−L1). In decoding, it is necessary to substitute LA−(LD/2) or LA+(LD/2) for the pixel values after decoded, depending on whether fi is 0 or 1.

According to the fifth embodiment, an image processor enabling very easy decoding can be obtained.

EMBODIMENT 6

In the foregoing embodiment, description concentrated on image data processing. This invention may be applied to a scanner, a printer, a facsimile, a digital copying machine and a display unit, using the concept of the above-mentioned image processing as the primary characteristic feature; the same results as with the foregoing embodiments can be guaranteed.

In this embodiment, since the coding memory can be used in different ways depending on whether or not image data is coded, effective image processing can be realized. Specifically, there exists certain image data which needs to be compressed to reduce the data quantity, while there exists some image data which can not be compressed. If image data is processed by irreversible image compression, quality of the image will generally be degraded. Of course, if image data is processed by reversible compression, then the compression rate cannot be kept constant; consequently, in the presence of various requirements, no effective use of the coding memory can be secured. Whereas, according to this embodiment, since fixed-length-compression coding is employed, it is possible to obtain an image processor which can flexibly cope with such various requirements.

In this embodiment, the color combination of red, green and blue, the color combination of cyan, magenta and yellow and the color combination of cyan, magenta, yellow and black are shown. This invention should by no means be limited to these illustrated examples and may also be applied to other color representations such as Y, I and Q.

According to the first aspect of the invention, since the coded data of plural colors is stored in the coding memory when the data is compressed by fixed-length-compression coding, it is possible to obtain an image processor which can operate effectively, regardless of coding.

According to the second aspect of the invention, since the compression rate is 4, it is possible to store the coded data of red, green and blue colors in the coding memory that is capable of storing one color of the original image data.

According to the third aspect of the invention, it is possible to store in the coding memory the coded data of three colors, i.e. cyan, magenta and yellow.

According to the fourth aspect of the invention, it is possible to store in the coding memory the coded data of four colors, i.e. cyan, magenta, yellow and black.

According to the fifth aspect of the invention, it is possible to provide an image processor which generates the coded data composed of the reference level, the differential value and the resolution component value.

Therefore, according to the foregoing aspects of the invention, since the memory can be used effectively regardless of coding, it is possible to provide a more inexpensive image processor.

According to the sixth aspect of the invention, corresponding to the first aspect of the invention, it is possible to provide an image processor which can decode the data coded by fixed-length-compression coding.

According to the seventh aspect of the invention, it is possible to decode the coded data of three colors, i.e. red, green and blue.

According to the eighth aspect of the invention, it is possible to decode the coded data of three colors, i.e. cyan, magenta and yellow.

According to the ninth aspect of the invention, it is possible to decode the coded data of four colors, i.e., cyan, magenta, yellow and black.

According to the tenth aspect of the invention, it is possible to provide an image processor which can decode the coded data composed of three components, i.e. the reference level, the differential value and the resolution component value.

Therefore, according to the sixth through tenth aspects of the invention, since the memory can be used effectively regardless of coding, it is possible to provide a more inexpensive image processor.

According to the eleventh aspect of the invention, since the coding memory has banks corresponding to the respective colors to be stored, it is possible to provide an image processor which can process the image data of each color simultaneously, realizing quick image processing.

According to the twelfth aspect of the invention, since the coding memory has four independent banks, it is possible to write and read the data of three colors, i.e., red, green and blue, independently.

According to the thirteenth aspect of the invention, since the coding memory has four independent banks, it is possible to write and read the data of three colors, i.e. cyan, magenta and yellow, independently.

According to the fourteenth aspect of the invention, since the coding memory has four independent banks, it is possible to write and read the coded data of four colors, i.e. cyan, magenta, yellow and black, independently.

According to the fifteenth and sixteenth aspects of the invention, since the coding memory is a nonvolatile or secondary storage, a more inexpensive image processor can be obtained. Alternatively the secondary storage may be a memory card with the same results.

According to the seventeenth aspect of the invention, since the coding memory generates the coded data of two components, i.e. the representative tonal levels and the resolution component value, it is possible to provide an image processor which can perform easy decoding.

According to the eighteenth aspect of the invention, it is possible to provide an image processor which decodes the coded data of two components.

According to the nineteenth and twentieth aspects of the invention, it is possible to provide a scanner which can demonstrate the same results as the image processor of each of the foregoing aspects of the invention.

According to the twenty-first and twenty-second aspects of the invention, it is possible to provide a printer which can demonstrate the same results as the image processor of each of the first through eighteenth aspects of the invention.

According to the twenty-third and twenty-fourth aspects of the invention, it is possible to provide a digital copying machine which can demonstrate the same results as the image processor of each of the first through eighteenth aspects of the invention.

According to the twenty-fifth and twenty-sixth aspects of the invention, it is possible to provide a display unit which can demonstrate the same results as the image processor of each of the first through eighteenth aspects of the invention.

What is claimed is:

1. An image processor comprising:

a buffer memory for storing original colored image data having a plurality of screens, wherein each screen comprises data for one color of the original colored image data, the buffer memory having an output;

an encoder for fixed-length block compression, the encoder compressing blocks of the original colored image data at a compression ratio of 2 to the power of N (N is a positive integer greater than or equal to 2), wherein each block comprises a plurality of pixels and wherein the compression ratio is defined by the number of uncompressed pixels divided by the number of compressed pixels, and wherein the encoder is connected to the output of the buffer memory and further, the encoder outputs coded data through an output;

a coding memory having a capacity defined by one screen of the original image data; and a write selector connected to the output of the buffer memory and to the output of the encoder, for selecting between the original colored image data outputted from the buffer memory or the coded colored data outputted from the encoder and storing the selected data in the coding memory;

wherein the coding memory stores either the coded data of plural colors from among the coded data of one screen when the write selector selects the encoder, or the coding memory stores one screen of the original data when the write selector selects the buffer memory.

2. An image processor according to claim 1, wherein the compression rate of said coding means is four, and said coding memory is capable of storing the coded data of all of red, green and blue colors from among the coded data of one screen when said write selector selects the coded data.

3. An image processor according to claim 1, wherein the compression rate of said coding means is four, and said coding memory is capable of storing the coded data of all of cyan, magenta and yellow colors from among the coded data of one screen when said write selector selects the coded data.

4. An image processor according to claim 3, wherein said coding memory is capable of storing the coded data of black color out of the coded data of the one screen when said write selector selects the coded data.

5. An image processor according to claim 1, wherein said coding means comprises:

(a) dividing means for dividing the original image data into small areas, each being a predetermined coding unit;

(b) reference level setting means for setting a reference level to be a reference when designating plural representative tonal levels representing the tonal levels of the individual pixels in each small area;

(c) differential value setting means for setting a differential value representing the difference between each of the representative tonal levels in the individual small area and the reference level; and (d) resolution component value setting means for setting, for each of the pixels in the individual small area, a resolution component value representing as to which pixel is associated with which one of the plural representative tonal levels;

(e) said coded data being the reference level, the differential value and the resolution component value for every small area.

* * * * *